United States Patent [19]
Takada et al.

[11] Patent Number: 5,351,126
[45] Date of Patent: Sep. 27, 1994

[54] OPTICAL MEASUREMENT SYSTEM FOR DETERMINATION OF AN OBJECT'S PROFILE OR THICKNESS

[75] Inventors: Yuji Takada, Kyoto; Hiroshi Matsuda, Hirakata; Toshiki Yamane, Sakai; Yoshihiko Sugimoto, Hirakata, all of Japan

[73] Assignee: Matsushita Electric Works, Ltd., Osaka, Japan

[21] Appl. No.: 967,601

[22] Filed: Oct. 28, 1992

[30] Foreign Application Priority Data

Oct. 31, 1991 [JP]  Japan ................................. 3-313532
Oct. 31, 1991 [JP]  Japan ................................. 3-313533
Dec. 20, 1991 [JP]  Japan ................................. 3-339041

[51] Int. Cl.$^5$ ...................... G01B 11/06; G01B 11/24
[52] U.S. Cl. ............................... 356/376; 250/560; 356/381
[58] Field of Search ............... 356/1, 376, 381; 250/560, 561

[56] References Cited

U.S. PATENT DOCUMENTS

| | | | |
|---|---|---|---|
| 3,612,890 | 10/1971 | Cornyn et al. | 250/222 |
| 4,298,286 | 11/1981 | Maxey et al. | 356/381 |
| 4,924,105 | 5/1990 | Nagao | 356/381 |
| 5,028,799 | 7/1991 | Chen et al. | 356/376 |

FOREIGN PATENT DOCUMENTS 150408   8/1985   European Pat. Off. .
291394  11/1988   European Pat. Off. .

*Primary Examiner*—F. L. Evans
*Attorney, Agent, or Firm*—Kenyon & Kenyon

[57] ABSTRACT

An optical measurement system for determination of a profile or thickness of an object includes first and second optical heads directing first and second light beams, respectively on first and second points on the surface of the object. Photo-sensors are included respectively in the first and second optical heads for receiving reflected lights from said first and second points and providing first and second outputs which varies in proportion to perpendicular distances from a reference plane to said first and second points on the object's surface. The first and second outputs are transmitted selectively to a single processing circuit through a switch. The processing circuit operates to process the first and second outputs in sequence to measure by triangulation the perpendicular distance of the first and second points from the reference plane and to analyze a surface or thickness of the object based upon thus measured perpendicular distances. With the use of the single processing circuit, the first and second outputs can be processed in the identical conditions to enable reliable determination of the perpendicular distances of the first and second points from the reference plane and therefore accurate analysis of the surface profile or the thickness of the object.

9 Claims, 11 Drawing Sheets

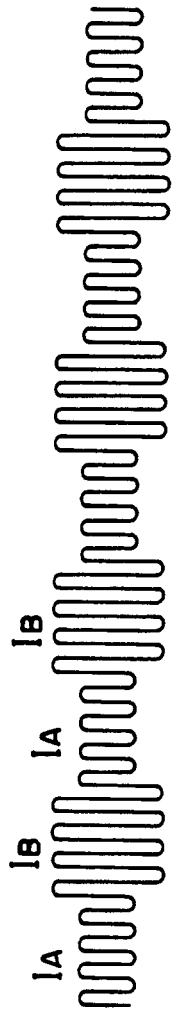
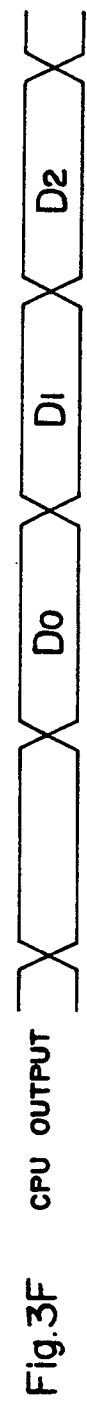

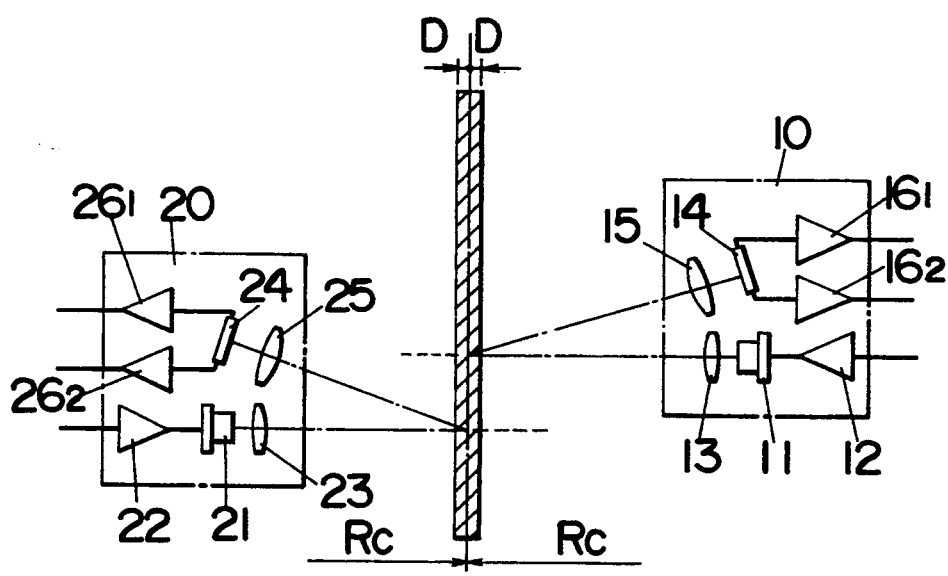

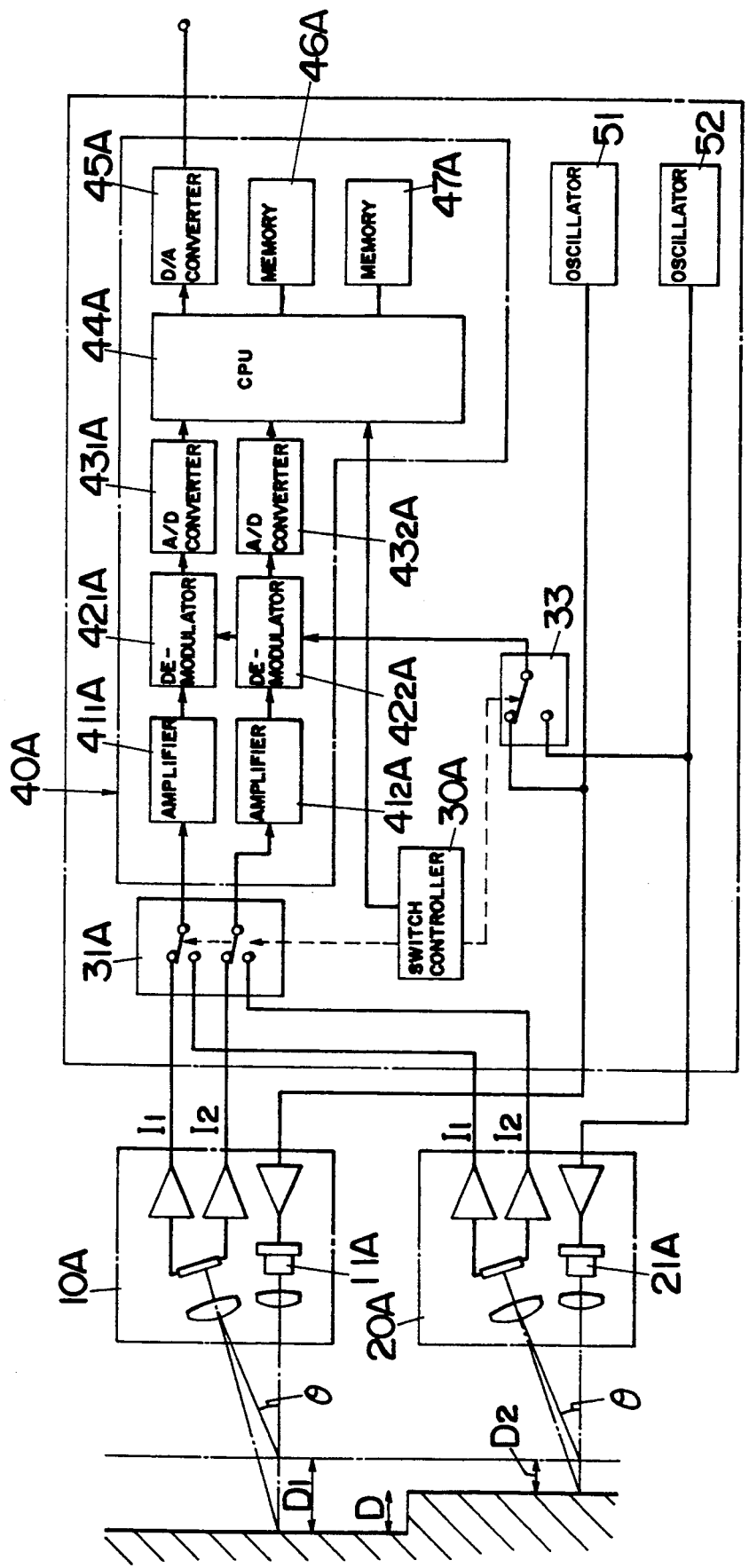

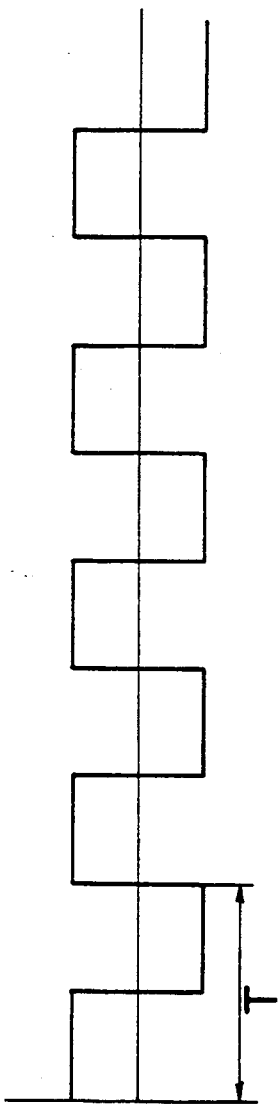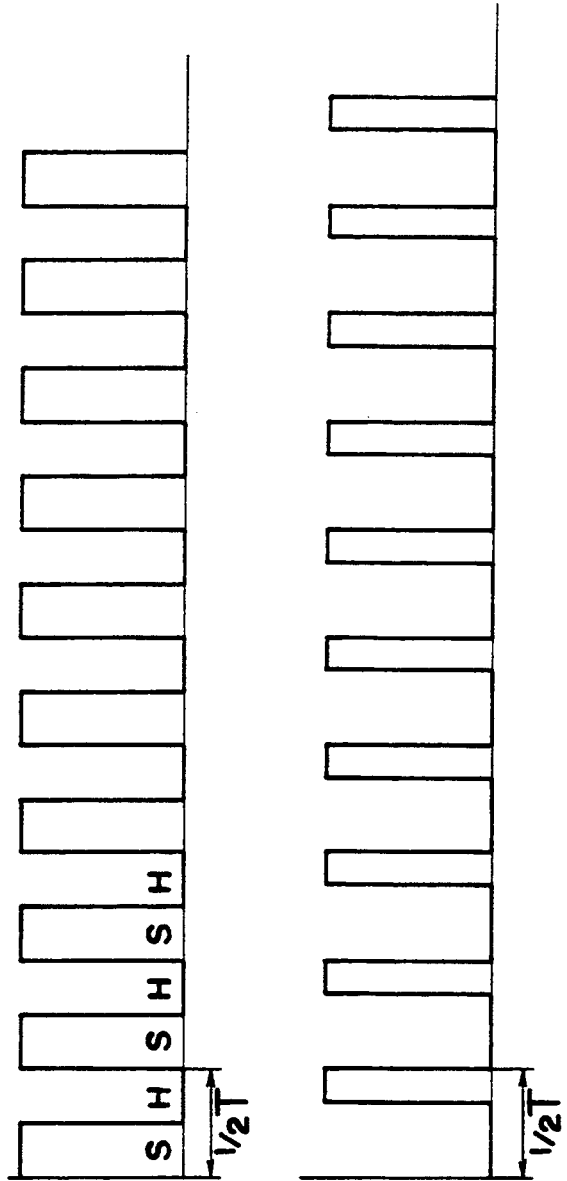

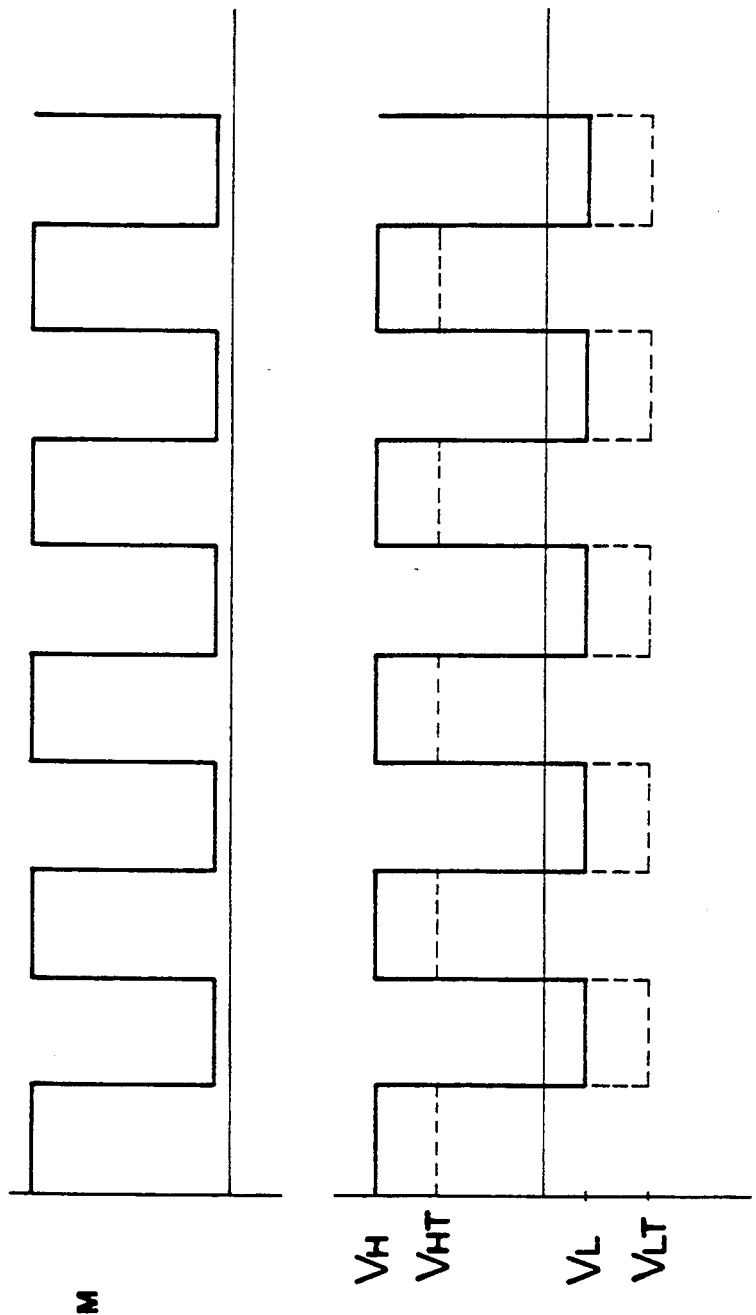

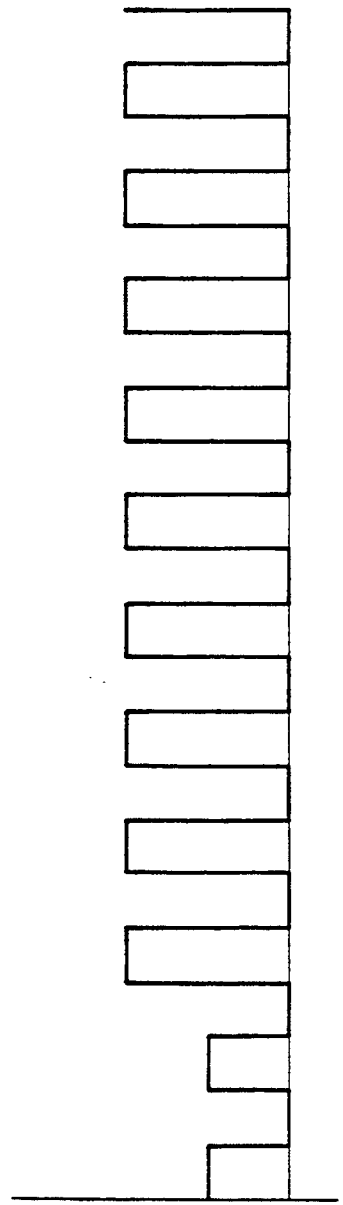
Fig.9A LASER BEAM RECEIVED AT PSD
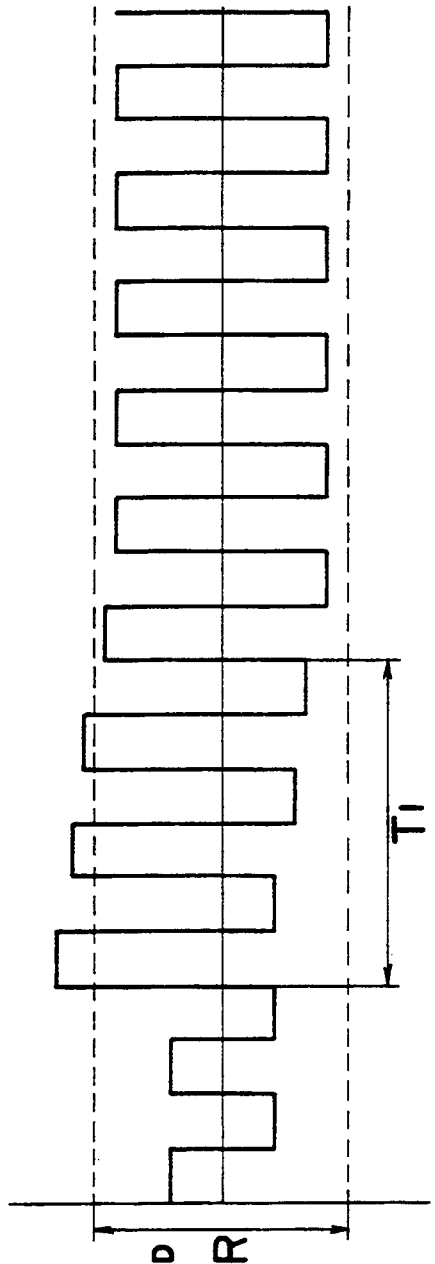
Fig.9B SAMPLE-AND-HOLD CIRCUIT OUTPUT

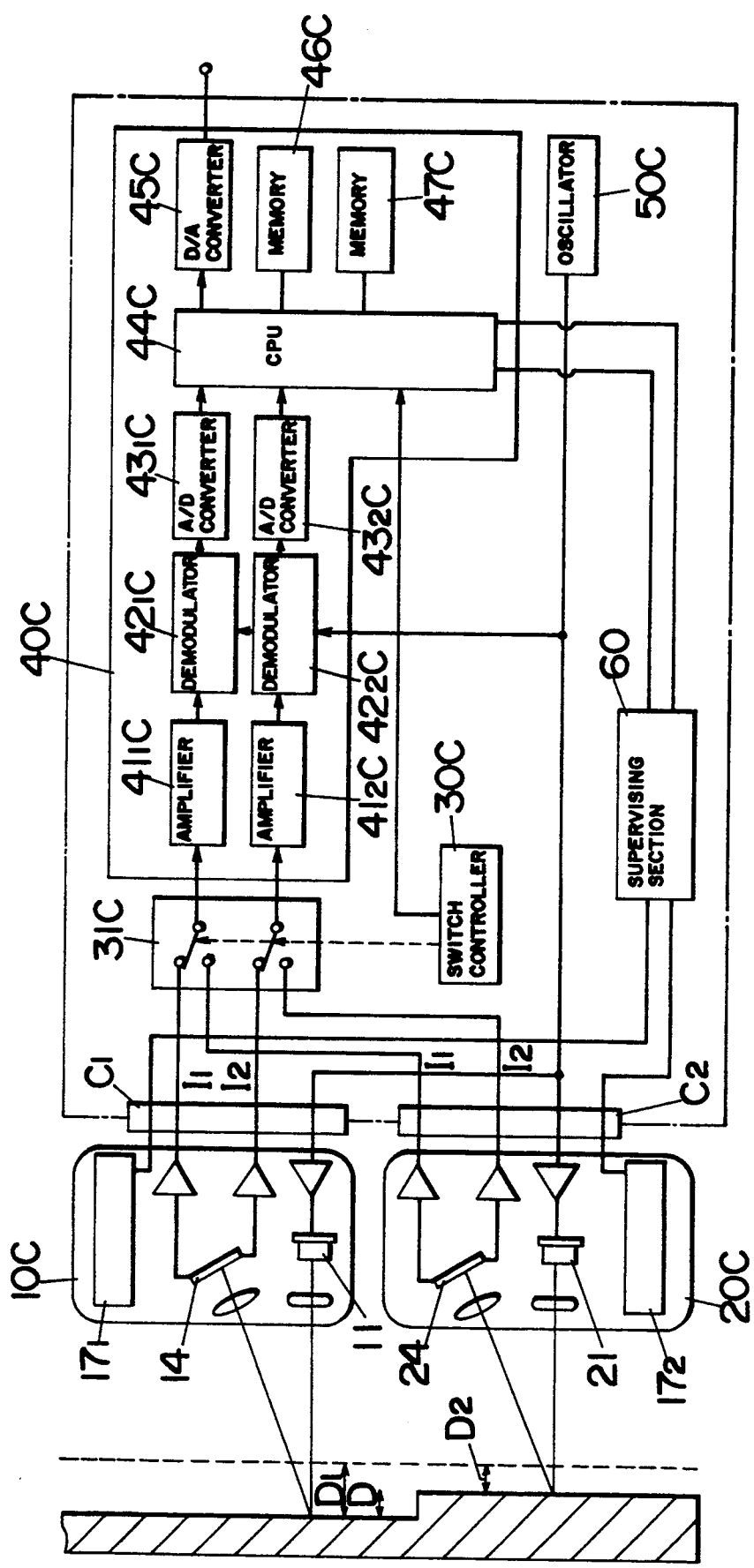

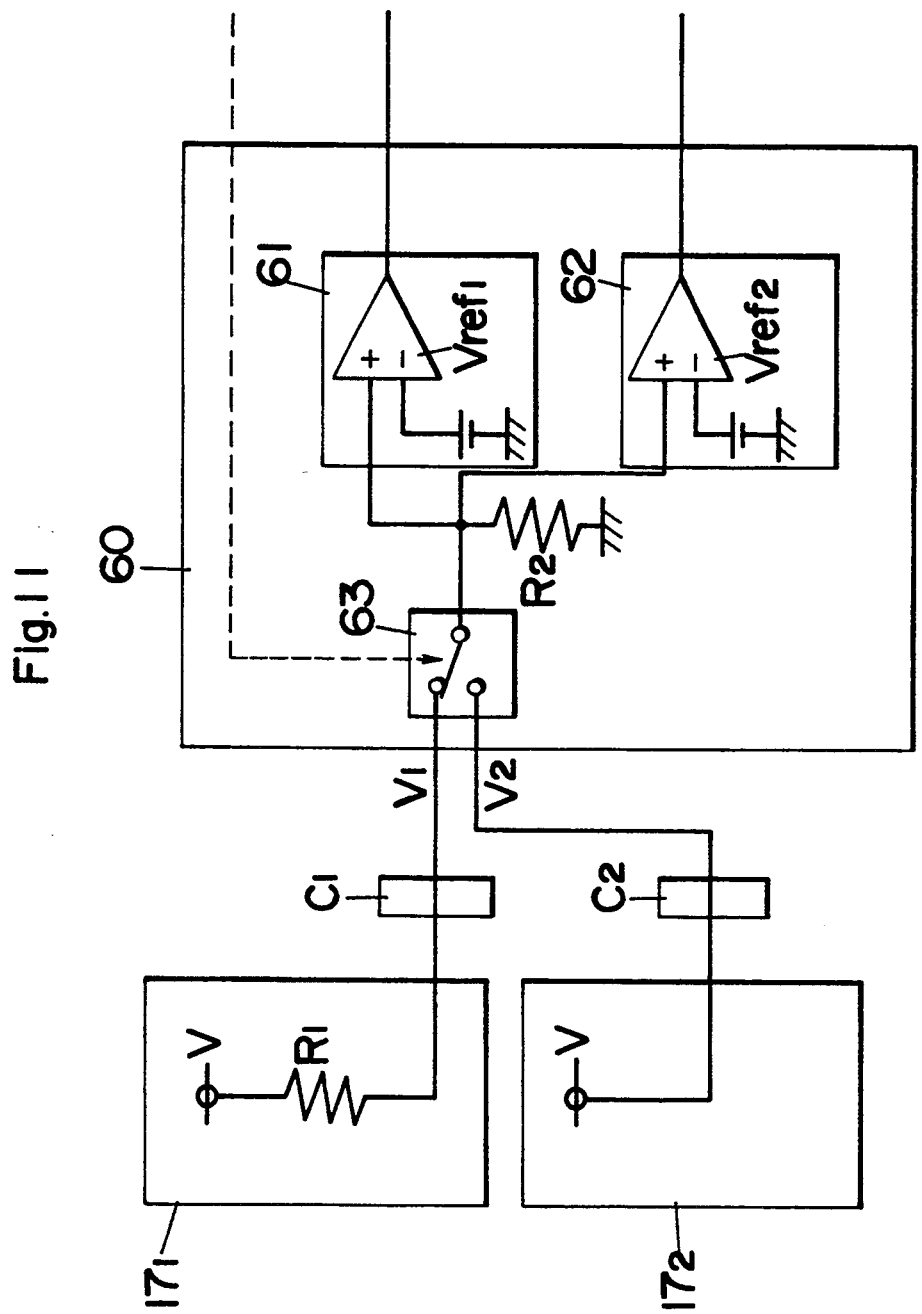

OPTICAL MEASUREMENT SYSTEM FOR DETERMINATION OF AN OBJECT'S PROFILE OR THICKNESS

BACKGROUND OF THE INVENTION

1. Field of the Invention

The present invention is directed to an optical measurement system for determination of an object's profile or thickness, and more particularly to such an optical measurement system using two optical heads directing individual light beams to different points on the object's surface to measure distances of these points from a reference plane by triangulation for analyzing the surface profile or the thickness of the object based upon the measured distances of the two points on the object's surface.

2. Description of the Prior Art

In order to obtain a depth or height of a step on the surface of an object or thickness of an object by optical triangulation measurement, it has been proposed to use a pair of optical heads disposed to direct individual light beams to different points on the object's surface for measuring the positions of these points. The distances of these points are processed by triangulation and are analyzed to determine the object profile. For example, when the two heads are disposed to measure the positions of the points spaced along the object's surface for measuring individual perpendicular distances to the surface from a reference plane, the difference of the measured distances gives the height or depth of a step existing between these two points. On the other hand, when the optical heads are disposed on the opposite of the object to measure like perpendicular distances of the positions of two points on the opposite surfaces of the object from a reference plane selected to be within the thickness of the object, the addition of the measured distances gives a thickness of the object at these points.

In such optical measurement systems, the optical head is normally designed to have a photo-sensor which receives the light beam reflected on a point on the object's surface and provides an output which varies in proportion to the perpendicular distance of the point from a reference plane selected to be generally parallel to the object's surface. The output from the head is processed in an associated signal processing circuit so as to determine a true distance of the point from the reference plane. In this connection, when the two heads are connected to the individual signal processing circuits, there is a potential problem that the distances measured in these separate processing circuits may include individual deviations or discrepancies due to inherent variations in the circuits, for example, deviations in the temperature characteristics of certain elements consisting the circuits. Since these discrepancies are inherent to the individual circuits, they are difficult to be compensated for in obtaining the step in the object's Surface and the thickness of the object. Thus, no reliable analysis is not expected in this system having two optical heads connected respectively to the individual processing circuits.

SUMMARY OF THE INVENTION

The above problem has been eliminated in the present invention which provides an improved optical measurement system for determination of a profile or thickness of an object. The system includes a pair of first and second optical heads and a single processing circuit which is responsible for processing the outputs from the first and second optical heads for surface or thickness measurement of a target object. The first and second optical heads include individual light projectors directing first and second light beams respectively to first and second points on the object's surface and include individual photo-sensors receiving the correspondingly reflected lights from the first and second points and providing first and second outputs, respectively which vary in proportion to a perpendicular distance from a reference plane to the first and second points on the object's surface. A switch is included in the system to selectively connect the first and second outputs from the first and second optical heads to the single processing circuit. The processing circuit operates to process the first and second outputs in sequence to measure by triangulation the perpendicular distance of the first and second points from the reference plane and to analyze a surface profile or thickness of the object based upon thus measured perpendicular distances. With the use of the single processing circuity to commonly process the first and second outputs from the first and second optical heads, the positions or perpendicular distances of the first and second points can be obtained through the identical triangulation processing, which gives reliable measurements for the perpendicular distances of the first and second points, thereby assuring correspondingly reliable determination of the surface profile or thickness of the object based upon thus measured perpendicular distances.

Accordingly, it is a primary object of the present invention to provide an improved optical measurement system which is capable of assuring reliable determination of the surface profile or thickness of the object.

In a preferred embodiment, the first and second optical heads are controlled to project the first and second light beams as pulse modulated ones in sequence such that only one of the first and second light beams is directed to the object surface at a time. With this result, it is readily possible to avoid any interference between the first and second light beams, in addition to well discriminate the light beam from the optical heads from a background illumination. Thus, more reliable determination can be achieved without suffering from interference between the light beams from the first and second optical heads and from the background illumination, which is therefore another object of the present invention.

In another preferred embodiment, the first and second optical heads are controlled to project first and second light beams which are pulse modulated to have different oscillating frequencies from each other. With this scheme, it is also possible to avoid interference between the light beams of the first and second optical heads as well as from the background illumination, yet without requiring a sequence control of directing the light beams in sequence from the first and second optical heads, which is therefore a further object of the present invention.

The processing circuit includes a calibrator which compensates for variations in the perpendicular distances measured respectively with respect to the first and second outputs when directing the first and second light beams to the first and second points selected on an optical flat plane parallel to the reference plane. Thus, possible misalignment between the first and second optical heads can be readily compensated for to thereby improve measurement reliability, which is therefore a still further object of the present invention.

Preferably, each of the modulated first and second light beams is configured to have high and low levels alternating to each other so that the corresponding one of the first and second optical heads produces high and low level values with respect to each of the first and second outputs. Thus obtained high and low level values are processed in the processing circuit to obtain a difference therebetween. The difference is used in the processing circuit as a true value for each of the first and second outputs to measure the perpendicular distance of each of the first and second points. In this scheme, therefore, the system can successfully cancel any errors resulting from background illumination as well as from variations in the characteristics of the elements forming the processing circuity.

It is therefore another object of the present invention to provide an improved optical measurement system which is capable of assuring reliable measurement substantially free from being influenced from the background illumination and characteristic variations in the elements forming the processing circuit.

The processing circuit is also configured to invalidate the measurement of the first and second distances when the high level value exceeds a predetermined maximum level or the low level value falls below a predetermined minimum level. That is, when the high and low level values are out of a workable range given to the processing circuit, the system itself can acknowledge erroneous measurement and disregard the measured results for retaining reliable measurement, which is therefore a still more object of the present invention.

These and still other objects and advantageous features of the present invention will become more apparent from the following description of the preferred embodiments when taken in conjunction with the attached drawings.

BRIEF DESCRIPTION OF THE DRAWINGS

FIG. 3, composed of FIGS. 3A to 3G, is a timing chart illustrating the operation of the above system;

FIG. 4 is a schematic view illustrating the above system utilized for determination of an object's thickness;

FIG. 5 is a schematic diagram of an optical measurement system in accordance with a second embodiment of the present invention;

FIG. 7, composed of FIGS. 7A to 7C, is a timing chart illustrating control signals utilized in a processing circuit of the system;

FIG. 8, composed of FIGS. 8A and 8B, is a waveform chart illustrating the operation of the processing circuit of FIG. 6;

FIG. 9, composed of FIGS. 9A and 9B, is a waveform chart illustrating another operation of the processing circuit of FIG. 6;

FIG. 10 is a schematic diagram illustrating a fourth embodiment in accordance with the present invention; and FIG. 11 is a schematic circuit diagram illustrating an operation of a supervising section incorporated in the system of FIG. 10.

DETAILED DESCRIPTION OF THE EMBODIMENTS

First Embodiment

FIGS. 1 To FIG. 4

Figure 1:
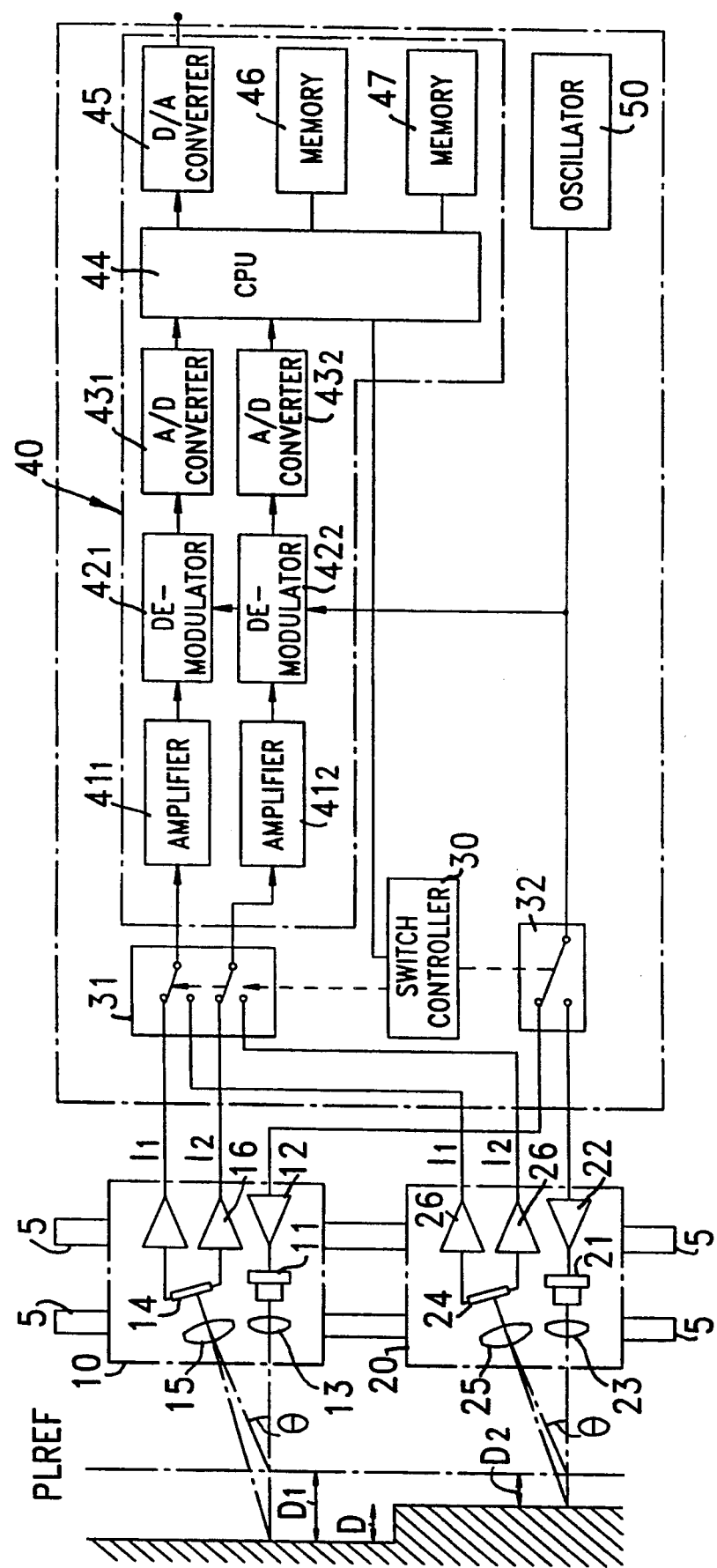
FIG. 1 is a schematic diagram of an optical measurement system in accordance with a first embodiment of the present invention, the system shown for measurement of a step in an object surface.

Referring now to FIG. 1, there is shown an optical measurement system in accordance with a first embodiment of the present invention. The system includes two optical heads, namely, first optical head 10 and second optical head 20, and a processing circuit 40 connected through a switch 31 to the first and second optical heads 10 and 20. The first and second optical heads 10 and 20 are provided to measure two positions on an object's surface for determination of the object's surface. In FIG. 1, the system is adapted to determine a depth D of a step in the object surface in such a manner as to measure the positions or perpendicular distances $D_1$ and $D_2$ of two spaced points from a reference plane PLref by the individual optical heads 10 and 20 and obtain the difference between $D_1$ and $D_2$ as the depth D of the step ($D=D_1-D_2$). Such measurement or determination of the step's depth is usually made with the object running in along the length of the step or in the direction perpendicular to the sheet relative to the first and second optical heads 10 and 20 which are normally fixed. The lateral distance between the optical heads 10 and 20 are suitably selected to measure the positions of the object's surface on both side of the step. In this connection, the heads 10 and 20 are supported on a suitable frame (5) and are held movable relative to each other in order to adjust the lateral distance. Further, the heads 10 and 20 are movable toward and away from the object surface for fine position adjustment. The system can be also adapted to determine the thickness of the object with the first and second optical heads 10 and 20 disposed on the opposite sides of the object, as shown in FIG. 4. In this case, the reference plane $PL_{ref}$ is selected within the thickness of the object such that the first and second optical heads 10 and 20 can measure the distances $D_1$ and $D_2$ of the points on the opposite surfaces from the reference plane $PL_{ref}$. Whereby, the thickness T can be determined by addition of $D_1$ and $D_2$ ($T=D_1+D_2$). In either application, the depth of the steps and the thickness of the object can be continuously determined so as to check variations thereof along one dimension of the object.

Figure 2:
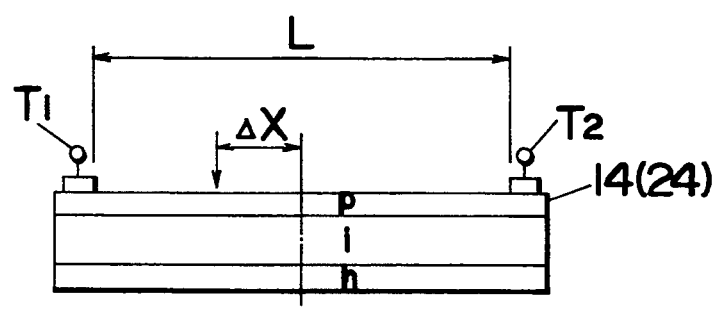
FIG. 2 is a schematic view illustrating a semi-conductor position sensor device (PSD) employed in the above system.

The first and second optical heads 10 and 20 are of the identical configuration and each comprises a laser generating element 11,21 driven by a common oscillator 50 through an amplifier 12,22 to generate a laser beam which is directed through a projector lens 13,23 to an object's surface, a semiconductor position sensing device [PSD] 14,24 receiving a laser beam reflected from the object surface through a collector lens 15,25. As shown in FIG. 2, PSD 14,24 has an elongated light receiving surface with a pair of terminals $T_1$ and $T_2$ at the opposite lengthwise ends thereof and is characterized to develop currents $I_1$ and $I_2$ at the terminals $T_1$ and $T_2$ of which values vary depending upon a point of receiving the light. These currents $I_1$ and $I_2$ are fed through individual amplifiers $16_1$ and $16_2$, $26_1$ and $26_2$ as outputs of the first and second optical heads 10 and 20. The center of PSD is aligned with an optical axis of the collector lens 15,25 so that a displacement ΔX of the receiving point from the center can be obtained from the following relation:

$$\Delta X = \frac{(I_1 - I_2)}{(I_1 + I_2)} \times \frac{L}{2}$$

wherein L is an effective length of the light receiving surface of PSD.

Taking into account for somewhat non-linear characteristic of PSD, the displacement can be obtained more precisely by the following relation:

$$\Delta X = \frac{(I_1 - I_2)}{(I_1 + kI_2)} \times \frac{L}{2} \quad (1)$$

wherein k is a constant selected to compensate for the non linearity.

Turning back to FIG. 1, each of the optical heads 10 and 20 is disposed with an optical axis of the projector lens 13,23 perpendicular to the object surface and with an optical axis of the collector lens 15,25 inclined at an angle of θ with respect to the perpendicular axis. The center of the collector lens 13,23 is spaced along the perpendicular axis by a fixed distance Rc from a reference point or the point at which the two optical axes cross at an angle θ. The reference points of the two optical heads 10 and 20 therefore define the reference plane PL$_{ref}$ perpendicular to the axis of the projecting laser beam and is parallel to a general plane of the object surface. The PSD 14,24 in each head is disposed with its photo-sensitive surface perpendicular to the optical axis of the collector lens 15,25 and spaced from the center of the lens by a focal length f thereof. When the laser beam from the optical head is reflected at a point on the object's surface spaced from the reference point or plane PL$_{ref}$ by a distance d along the perpendicular optical axis, the reflected laser beam will impinge on the surface of PSD at a point offset from the longitudinal center of PSD by a displacement of ΔX. From this geometrical relationship, the positioning of the object surface can be effected by triangulation through the following equation:

$$\Delta X = \frac{d \cdot f \cdot \tan\theta}{\frac{Rc}{\cos^2\theta} + d} \quad (2)$$

Therefore, combining this equation (2) with the above equation (1) can gives the distance d of the points on the object surface from the reference plane PL$_{ref}$ by incorporating the outputs I$_1$ and I$_2$ of the PSD. Such arithmetic operations are made at the processing circuit 40.

The laser beam generated at the first and second optical heads 10 and 20 is modulated by a pulse signal from the oscillator 50 such that each optical head receives modulated laser beam reflected from the object's surface and issues corresponding modulated outputs I$_1$ and I$_2$ therefrom. The outputs I$_1$ and I$_2$ are demodulated in the processing circuit 40 to give corresponding values which are free from background illumination on the object surface and therefore give reliable data for measurement of the distance D$_1$ and D$_2$. The pulse signal from the oscillator 50 is controlled by a switch controller 30 to be fed through a switch 32 alternately to the first and second optical heads 10 and 20 such that the optical heads 10 and 20 are enabled alternately. The switch controller 30 also controls the switch 31 for feeding the outputs from the first and second optical heads 10 and 20 alternately to the processing circuit 40. The processing circuit 40, oscillator 50, switch controller 30, and switches 31 and 32 are assembled into a housing (not shown) and the optical heads 10 and 20 are connected to the housing through individual cables leading to the switches 31 and 32.

The processing circuit 40 comprises a pair of amplifiers 41$_1$, 41$_2$, demodulators 42$_1$, 42$_2$, and analog-to-digital [A/D] converter 43$_1$, 43$_2$, in addition to a CPU 44, a digital-to-analog [D/A] converter 45, and memories 46 and 47. The outputs I$_1$ and I$_2$ from either of the optical heads 10 or 20 are amplified and converted at the amplifiers 41$_1$, 41$_2$ into corresponding voltages which are then demodulated at 42$_1$, 42$_2$ to provide analog signals indicative of the position of the object surface free from being influenced by the background illumination. The analog signals are converted at the A/D converters 43$_1$, 43$_2$ into digital signals for arithmetic operation at the CPU 44 to measure the perpendicular distances D$_1$ and D$_2$ of the object surface form the reference plane PL$_{ref}$ in the manner as discussed hereinbefore. CPU 44 provides an output indicative of the measurement result which is converted at D/A converter 45 into analog signal for analog indication at an exterior display or processing at another device connected to the processing circuit. The above operation is illustrated in FIG. 3, composed of FIGS. 3A to 3G, in which the outputs I$_1$ and I$_2$ of the first optical head 10 is shown as a position current I$_A$ while the I$_1$ and I$_2$ of the second optical head 20 is shown as a like position current I$_B$ (FIG. 3B). The current I$_A$ and I$_B$ are sequentially processed into digital signals S$_{A0}$ and S$_{B0}$, S$_{A1}$ and S$_{B1}$ .... (FIG. 3C) in synchronism with a switch control signal SW$_c$ (FIG. 3A) which effects the changeover of the switches 31 and 32 to alternately activate the optical heads 10 and 20 and process the output from the corresponding one of the heads 10 and 20. Digital signals S$_{A0}$, S$_{A1}$, ... and S$_{B0}$, S$_{B1}$, ... are stored respectively into memories 46 and 47 (FIGS. 3D and 3E), and are then processed at CPU 44 to provide outputs or measurement results D$_0$, D$_1$, D$_2$, ... (FIG. 3F). The CPU's outputs are thereafter converted at D/A converter into continuous analog signals (FIG. 3G). In this manner, the measurement is made continuously while the processing circuit 40 receives the outputs of the first and second optical heads 10 and 20, alternately.

The CPU 45 is programmed to enable a calibration which compensate for any variations in characteristics of the electrical components used in the processing circuit 40 as well as possible misalignment between the two optical heads 10 and 20. That is, the calibration is made by the use of an optical flat plane to measure two points on the optical flat plane such that the system gives zero difference between the measured distances D$_1$ and D$_2$ by incorporating an offset value which is stored in one of the memories 46 and 47 or another memory and is subsequently utilized for providing a correct measurement.

Second Embodiment

FIG. 5

FIG. 5 illustrates a like optical measurement system in accordance with a second embodiment of the present invention which is identical in configuration and operation to those of the first embodiment except that a pair of first and second oscillators 51 and 52 are included in the system for generating at the first and second optical heads 10A and 20A modulate laser beams of different oscillating frequencies in order to avoid interference between the laser beams from the first and second optical heads. In this embodiment, the first and second optical heads 10A and 20A are kept activated continuously as opposed to the first embodiment where they are alternately activated. With the inclusion of the two oscillators 51 and 52, a switch controller 30A is configured to operate demodulators $42_1$A and $42_2$A at the corresponding frequencies by means of a switch 33, in addition to alternately transmitting the outputs from the first and second optical heads 10A and 20A to a processing unit 40A through a switch 31A. Like parts or elements are designated by like numerals with a suffix letter of "A".

Third Embodiment
FIGS. 6 To 9

Figure 6:
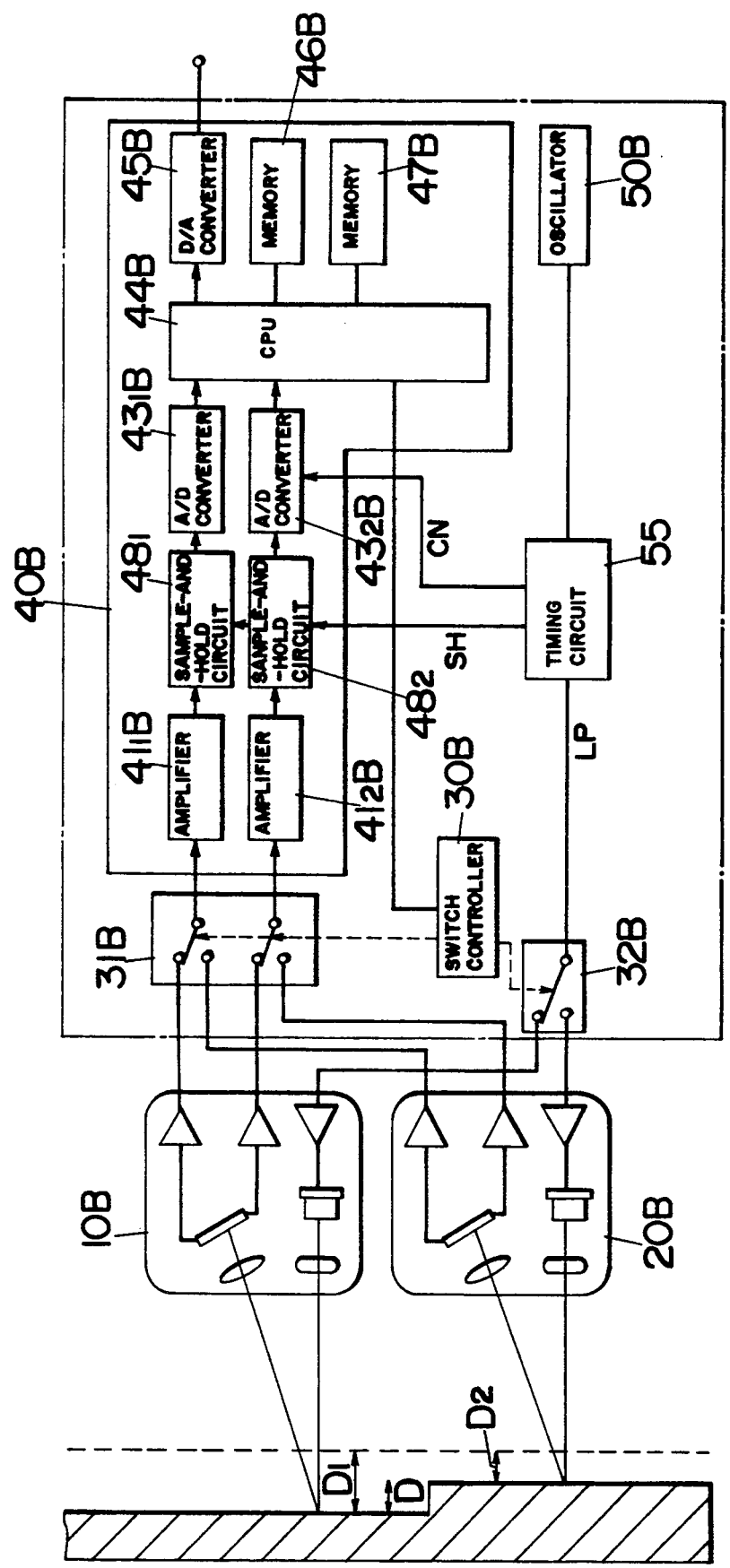
FIG. 6 is a schematic diagram of an optical measurement system in accordance with a third embodiment of the present invention.

FIG. 6 illustrates a like optical measurement system in accordance with a third embodiment of the present invention which is identical in configuration and operation to the first embodiment except that a pair of sample-and-hold (S/H) circuits $48_1$ and $48_2$ is included in a processing circuit 40B in place of the demodulators in the first embodiment. Also included in the processing circuit 40B in association with the S/H circuits is a timing circuit 55 which generates timed pulses LP, SH, and CN based upon the oscillating frequency of the oscillator 50B. Pulses LP are fed alternately to the first and second optical heads 10B and 20B through a switch 32B to generate the pulse modulated laser beam of a given frequency, as shown in FIG. 7A. The resulting laser beams are each characterized to have high and low levels such that each of the first and second optical heads 10B and 20B provides correspondingly high and low level values for each of the outputs $I_1$ and $I_2$ from the opposite ends of PSD 14B within one cycle T of the pulses $D_1$. Pulses SH are fed to the S/H circuits $48_1$ and $48_2$ in order to sample and hold the high level value for each of the outputs $I_1$ and $I_2$ within a half cycle (T/2) of the laser beam generating pulses LP and subsequently sample and hold the low level value for the same within the other half cycle of the pulses LP, as shown in FIG. 7B. In this manner, the high level and low level values within one pulse of the reflected laser beam from the object's surface to the PSD are taken and then converted at individual A/D converters $43_1$B and $43_2$B into corresponding high and low digital values $V_H$ and $V_L$ under the control of the pulses CN fed to the A/D converters as control pulses, as shown in FIG. 7C. Thus obtained digital values are processed at the CPU 44B to provide a difference value $V_{def}$ between the high and low level values ($V_{def}=V_H-V_L$) within one cycle of the laser beam received at the PSD for each of the outputs $I_1$ and $I_2$ from each one of the optical heads 10B and 20B. This subtraction can therefore cancel any variations in characteristics of the electrical components in the circuit as well as the background illumination because of that such variations will appear equally in the high and low level values and can be therefore eliminated in the difference value ($V_{def}=V_H-V_L$). This is more apparent when considering the followings with reference to FIGS. 8A and 8B which illustrate exemplarily the waveform of the laser beam received at the PSD and the waveform in solid line of the output of the amplifiers $41_1$B or $41_2$B. The output of the amplifier gives high and low level values $V_H$ and $V_L$ which includes true values $V_{HT}$ and $V_{LT}$ (shown in dotted waveform in FIG. 8B) plus the variations var of the same extent, as expressed in the below.

$$V_H = V_{HT} + var$$

$$V_L = V_{LT} + var$$

Therefore, subtraction of $V_H$ and $V_L$ will cancel the variations and results in the difference between the true values ($V_{HT}-V_{LT}$). In this manner, the system can extract from the outputs $I_1$ and $I_2$ of the PSD of each optical head reliable and true data indicative of the position of the object surface and is therefore capable of reliably measuring the distances of the individual points on the object's surface from the reference plane $PL_{ref}$ for accurate determination of the depth D of the step in the object surface.

The system additionally includes error-free capability of invalidating the measurement when the high level value $V_H$ or low level value $V_L$ goes beyond an allowable range R of the A/D converter $43_1$B or $43_2$B. For example, as shown in FIG. 9A and 9B, when the level of the laser beam received at the PSD increases remarkably, as shown in FIG. 9A, due to, for example, an abrupt increase in reflectance of the object's surface, an overshooting will occur in the output of the S/H circuit such that the A/D converter $43_1$B receives abnormally increased high level output beyond the allowable range R for a while, as indicated by a time interval of $T_1$ in FIG. 9B, until the correct level output is reached. During that interval, A/D converter will generate a maximum level value although it does not actually indicate the intensity of the laser beam received at the PSD and would therefore result in erroneous measurement at CPU. However, such erroneous measurement can be avoided by the above arrangement which is applied to both of the outputs $I_1$ and $I_2$ of the PSD for each of the optical heads 10B and 20B.

Fourth embodiment
FIGS. 10 And 11

FIG. 10 illustrates a like optical measurement system in accordance with a fourth embodiment of the present invention which is basically identical to the first embodiment except that a supervising section 60 is included in a processing circuit 40C for checking whether first and second optical heads 10C and 20C are correctly coupled to corresponding connectors $C_1$ and $C_2$ of the processing circuit 40C. Like elements and components are designated by like numerals with a suffix letter of "C". The connectors $C_1$ and $C_2$ are provided on a housing incorporating the processing circuit 40C together with the supervising section 60, an oscillator 50C, a switch controller 30C, and the switch 31C. For reason of that there may be some variation in output characteristic of the separate heads 10C and 20C, the calibration is made in the system to compensate for that variation in order to give consistent measurement. That is, the processing circuit 40C is given suitable compensation at the calibration which is stored in the memory and is utilized in measurement of the individual distances of the points on the object's surface from the outputs of the separate heads 10C and 20C. Such compensation can be effective provided that the two optical heads 10C and 20C are correctly coupled to the connectors $C_1$ and $C_2$ of the processing circuit 40C. The correct connection is checked at the supervising section 60 for providing consistent measurements. As shown in FIG. 11, the supervising section 60 comprises a pair of first and second comparators 61 and 62 and a switch 63 which is controlled by CPU of the processing circuit to transmit in sequence different voltage signals $V_1$ and $V_2$ for the individual heads 10C and 20C through the connectors $C_1$ and $C_2$. The voltage signals $V_1$ and $V_2$ are issued from address signal generators $17_1$ and $17_2$, respectively included in the optical heads 10C and 20C. In this instance, the voltage signal $V_1$ for the first head 10C is obtained from a fixed voltage V through a resistor $R_1$, while the voltage signal $V_2$ is obtained directly from the fixed voltage V. A resistor $R_2$ is connected commonly to (+) inputs of the comparators 61 and 62 so that the first and second comparators 61 and 62 receive at their (+) inputs the voltage $V_{in} = V \times R_2/(R_1+R_2)$ and $V_{in} = V$, respectively when the first and second optical heads 10C and 20C are coupled correctly to the connectors $C_1$ and $C_2$, respectively. The first and second comparators 61 and 62 have reference voltages $V_{ref1}$ and $V_{ref2}$ ($V_{ref1} < V_{ref2}$) so that the first comparator 61 outputs a H-level signal when the input voltage $V_{in}$ exceeds the reference voltage $V_{ref1}$ and outputs a L-level signal otherwise, and the second comparator 62 outputs a H-level signal when the input voltage $V_{in}$ exceeds the reference voltage $V_{ref2}$ and a L-level signal otherwise. The outputs of the first and second comparators 61 and 62 are fed to the CPU of the processing circuit 40C where they are analyzed to judge whether the heads 10C and 20C are correctly coupled to the associated connectors $C_1$ and $C_2$. When, for example, the first comparator 61 outputs the H-level signal as indicative of that the either of the head 10C or 20C is coupled to the connector $C_1$, then the CPU checks whether the output of the second comparator 62 and judges that the heads 10C and 20C are correctly coupled to the associated terminals $C_1$ and $C_2$, respectively when the second comparator 62 outputs the H-level signal, and that the heads 10C and 20C are mis-coupled to the terminals $C_1$ and $C_2$, respectively or even no connection is made to the terminal $C_2$ when the second comparator 62 outputs the L-level signal. Further, when the first comparator 61 outputs the L-level signal, the CPU acknowledges that at least the terminal $C_1$ is not connected to any one of the heads. When the non-connection or mis-connection is judged, the system responds to disable the measurement and produces a warning signal urging the user to reconnect the heads to the correct terminals. Instead of using the voltage signals differentiated by the use of the resistor $R_1$, it is equally possible to provide coded signals from the individual heads so that the processing circuit can acknowledge the heads by analysis of the coded signals.

It should be noted that the present invention should not be limited to the two-head measurement system and may includes three or more optical heads for analyzing the object's surface in view of three or more points on the object's surface. In such modification also, the single processing circuit is responsible for measurement of the individual distances or positions of these points from the outputs of the individual optical heads.

LIST OF REFERENCE NUMERALS 10 first optical head
11 laser generating element
12 amplifier
13 projector lens
14 PSD
15 collector lens
16 amplifier
17 address signal generator
20 second optical head
30 switch controller
31 switch
32 switch
33 switch
40 processing circuit
41 amplifier
42 demodulator
43 A/D converter
44 CPU
45 D/A converter
46 memory
47 memory
48 sample-and-hold circuit
50 oscillator
51 first oscillator
52 second oscillator
55 timing circuit
60 supervising section
61 comparator
62 comparator
63 switch

What is claimed is:

1. An optical measurement system for determination of a profile or thickness of an object, said system comprising:
 a first optical head including light projector means directing a first light beam to a first point on a surface of the object and including photo-sensor means receiving a reflected light from said first point on the surface and providing a first output which varies in proportion to a perpendicular distance from a reference plane to said first point on the object's surface;
 a second optical head including light projector means directing a second light beam to a second point on a surface of the object and including photo-sensor means receiving a reflected light from said second point on the surface and providing a second output which varies in proportion to a perpendicular distance from a reference plane to said second point on the object's surface;
 switch means selectively connecting said first and second outputs to a single processing circuit,
 said single processing circuit operating to process said first and second outputs in sequence to measure by triangulation the perpendicular distances of said first and second points from said reference plane and to analyze a surface or thickness of the object based upon thus measured perpendicular distances.

2. An optical measurement system as set forth in claim 1, wherein said first and second optical heads are controlled to project in sequence said first and second light beams of pulse modulated ones, said processing circuit including demodulator means demodulating said first and second outputs for processing resulting demodulated signals in measurement of said perpendicular distances of said first and second points.

3. An optical measurement system as set forth in claim 1, wherein said first and second optical heads project first and second light beams which are pulse modulated to have different oscillating frequencies from each other, said processing circuit including demodulator means demodulating said first and second outputs for processing resulting demodulated signals in measurement of said perpendicular distances of said first and second points.

4. An optical measurement system as set forth in claim 1, wherein said processing circuit includes calibration means which compensates for variations in said perpendicular distances measured respectively with respect to said first and second outputs from said first and second optical heads when directing said first and second light beams to said first and second points selected on an optical flat plane parallel to said reference plane.

5. An optical measurement system as set forth in claim 1 or 4, further including a support frame for supporting the first and second optical heads in movable relationship to each other in a direction perpendicular to optical axes of said first and second light beams.

6. An optical measurement system as set forth in claim 1, wherein said first and second light beams are of modulated ones each comprising high and low levels alternating to each other so that said first and second optical heads produce high level and low level values with respect to each of said first and second outputs, said processing circuit including level detection means to calculate a difference between said high and low level values for each of said first and second outputs and use said difference as a true value for each of said first and second outputs in measurement of said first and second perpendicular distances.

7. An optical measurement system as set forth in claim 6, wherein said level detection means comprises a sample-and-hold circuit which operates in synchronism with said pulse modulated first and second light beams so as to obtain said high and low level values for each of said first and second outputs.

8. An optical measurement system as set forth in claim 6, wherein said processing circuit includes error detecting means which invalidates the measurement of said first and second distances when said high level value exceeds a predetermined maximum level or said low level value falls below a predetermined minimum level.

9. An optical measurement method for determination of a profile or thickness of an object, said method using:
   a first optical head including light projector means directing a first light beam to a first point on a surface of the object and including photo-sensor means receiving a reflected light from said first point on the surface and providing a first output which varies in proportion to a perpendicular distance from a reference plane to said first point on the object's surface;
   a second optical head including light projector means directing a second light beam to a second point on a surface of the object and including photo-sensor means receiving a reflected light from said second point on the surface and providing a second output which varies in proportion to a perpendicular distance from a reference plane to said second point on the object's surface; and
   a single processing circuit capable of processing said first and second outputs to measure by triangulation the perpendicular distances of said first and second points respectively from said reference plane and analyzing a surface or thickness of the object based upon thus measured perpendicular distances,
said method comprising delivering said first output from said first optical head to said processing circuit for determination of said perpendicular distance and then delivering said second output from said second optical head to said common processing circuit for determination of said perpendicular distance, thereby enabling said processing circuity to analyze the surface or thickness of said object from the individual perpendicular distances.

* * * * *